United States Patent [19]
Cohn et al.

[11] Patent Number: 4,915,639
[45] Date of Patent: Apr. 10, 1990

[54] "SMART" AC RECEPTACLE AND COMPLEMENTARY PLUG

[75] Inventors: Steven C. Cohn, Jericho; Michael A. Kelly, Amityville, both of N.Y.

[73] Assignee: B.A.S.E.C. Industries, Ltd., Mineola, N.Y.

[21] Appl. No.: 268,896

[22] Filed: Nov. 8, 1988

[51] Int. Cl.$^4$ .......................................... H01R 13/703
[52] U.S. Cl. ................... 439/188; 307/116; 307/125; 307/140; 439/488
[58] Field of Search ............. 439/188, 488, 489, 490; 200/51 R, 51.09; 307/112, 116, 117, 140, 146, 125, 134; 361/1; 340/654, 656

[56] References Cited

U.S. PATENT DOCUMENTS

| | | | |
|---|---|---|---|
| 3,496,500 | 2/1970 | Romary | 200/51.09 |
| 3,524,072 | 8/1970 | Tsergas | 307/112 |
| 4,298,792 | 3/1981 | Granholm et al. | 307/10.5 |
| 4,591,732 | 5/1986 | Neuenschwander | 307/140 |
| 4,675,769 | 6/1987 | Marshall et al. | 307/140 |

Primary Examiner—Neil Abrams
Attorney, Agent, or Firm—Bauer & Schaffer

[57] ABSTRACT

An intelligent AC outlet is adapted to mate with a plug. The plug carries coded information as to the power which it draws. A microprocessor, a switch and a sensor are carried in the outlet. The switch is interposed between the outlet and AC power lines and is operated by the microprocessor. The microprocessor continually scans the sensor. When the plug is inserted into the outlet, the sensor reads the code. If the microprocessor detects a valid code, it operates the switch applying power to the plug. If a valid code is not detected, the outlet remains electrically isolated from the power lines and this can not be overriden by the user.

11 Claims, 2 Drawing Sheets

| CODES | | | | | |
|---|---|---|---|---|---|
| A1 | A2 | A3 | A4 | CODE | |
| B1 | B2 | B3 | B4 | | |
| | S1 | S2 | S3 | | WATTS |
| 0 | 0 | 0 | 1 | 1 | 100 |
| 0 | 0 | 1 | 0 | 2 | 250 |
| 0 | 0 | 1 | 1 | 3 | 500 |
| 0 | 0 | 0 | 0 | 4 | 750 |
| 0 | 1 | 0 | 1 | 5 | 1250 |
| 0 | 1 | 1 | 0 | 6 | 2500 |
| 0 | 1 | 1 | 1 | 7 | 3500 |

"SMART" AC RECEPTACLE AND COMPLEMENTARY PLUG

This invention relates to microprocessor controlled or 'smart' AC outlet and encoded plug which can be read by the microprocessor.

Common wall mounted AC outlets have different current ratings which should not be exceeded. Excessive current drawn on a properly fused line will open the fuse before excessive heat can be generated in the wires going to the appliance. The obvious problem is that, knowingly or unknowingly, the fuseable link is replaced with one having an excessively large current capacity, larger than the wires can safely handle. In this situation wires can overheat and this results in a fire hazard or, owing to heat-embrittled insulation, a shock hazard.

The present invention overcomes the drawbacks associated with conventional AC outlets and provides for an outlet controlled by a microprocessor. In general the present invention comprises a more or less conventionally configured two socket outlet internally fitted with a microprocessor or microcomputer. Switch means or triacs carried in the outlet electrically isolate one or more of the contacts of a given socket from the AC mains or power lines. These switches are controlled by the microprocessor and normally isolate a respective socket form the AC lines. A conventional AC plug, which is attached to the device to be powered, is encoded with information as to the current drawn or wattage. Preferably, this encoding is in the form of an optical bar code. Each socket preferably carries a microsensor or bar code reader. The output of this sensor is in communication with the microprocessor. The microprocessor is preprogrammed with the current capabilities of the outlet (socket) in which it sits. When a plug is inserted in this socket, the microsensor reads the code on the plug. The microcomputer scans the sensor for a valid code. When a valid code is detected, the microcomputer checks for the rated current draw or output. If the output or current to be drawn by the plug is less then that which is available at this outlet, the microprocessor turns on the switch or triacs and current is fed to the appliance. When a second plug is inserted into the second socket (for a two socket outlet), the above sequence is repeated for this second plug. If the combined or expected current draw (wattage) of the two plugs is less then the rated available for the outlet, the microcomputer will turn on the triac feeding the second socket. If the demand of this second plug will exceed the preprogrammed available at this outlet, power to the second plug remains inhibited. Moreover, in event of an overload or temperature rise in the outlet, the outlet can be quickly and safely shut down and then placed back on line when the overload is removed.

It is therefore an object of the present invention to provide a smart AC outlet of conventional configuration for automatic control of the electrical current therethrough.

It is a further object of the present invention to provide a microprocessor controlled AC outlet designed to read a plug carrying coded information wherein the code on the plug informs the microprocessor of the current to be drawn.

It is another object of the present invention to provide a smart AC outlet and complementary plug both of which are of conventional form wherein the outlet is capable of detecting an overload and essentially instantaneously shutting down upon the same.

It is another object of the present invention to configure a conventional plug for carrying a code that can be read by a sensor.

It is a still further object of the present invention to provide a means for the automatic control of electrical power to an appliance wherein a more or less conventional AC outlet and plug are employed and wherein the user is taken out of the decision making process.

Other objects and features of the present invention will become apparent from the following detailed description considered in connection with the accompanying drawings. It is to be understood, however, that the drawings are designed for purposes of illustration only and not as a definition of the limits of the invention for which reference should be made to the appending claims.

In the drawings, wherein the same reference numeral denotes the same element throughout the several views.

Figure 1:
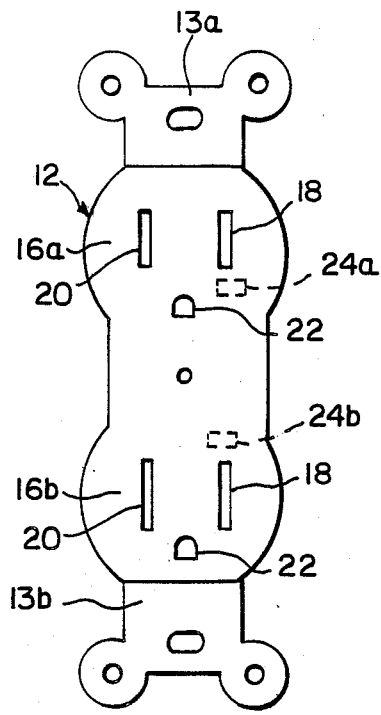
FIG. 1 is a front view of the inventive outlet showing its conventional configuration.

In detail now and referring to FIGS. 1–6, the inventive apparatus is indicated generally as reference numeral 10. The apparatus includes a smart or intelligent AC outlet housing 12 and a complementary sized plug 14. Outlet 12 has a conventional outline or shape designed for standard wall mount and includes two laterally extending mounting flanges 13a and 13b. Outlet 12 further includes two standard AC sockets 16a and 16b each configured to receive a plug 14. Each socket is designed for conventional AC feed and thus each is equipped with conventional openings and contacts for "hot" 18, "neutral" 20, and "ground" 22 connections. As is standard construction, each contact 18 and 20 is comprised of one finger or a pair of fingers that frictionally grasp the flat sides of a respective prong of plug 14.

A sensor 24a and 24b is mounted or carried in outlet 12 adjacent to a respective socket 16a and 16b, as shown. Each sensor is positioned in outlet 12 so as to be in close confronting position to the transverse edge of a prong of plug 14 when the plug is inserted in either socket 16 or 16b. Put another way, each one of sensors 24a and 24b which is associated with a corresponding socket 16a and 16b, is, preferably, aligned along the longitudinal transverse edge of a given contact or finger 18. With this alignment of the sensors, a given sensor can read the code on the transverse edge of plug 14 when the plug is inserted into either of sockets 16a or 16b, as will be discussed below. It is to be understood that the placement of sensor 24a and 24b is illustrative only. A given sensor can be aligned along the transverse edge of a given contact or finger 20. The only criteria for the placement of the sensor is that it be in a position to read the code on plug 14 when the plug is inserted into a respective socket.

Figure 2:
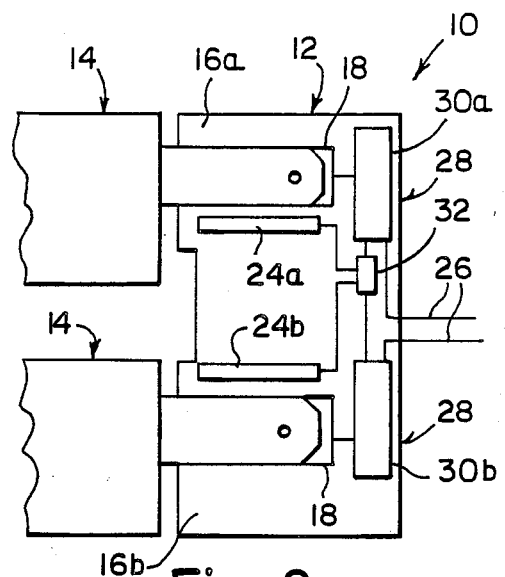
FIG. 2 is a side elevational view, in diagrammatic section, of the inventive outlet of FIG. 1 shown mated with the inventive plug.
Figure 3:
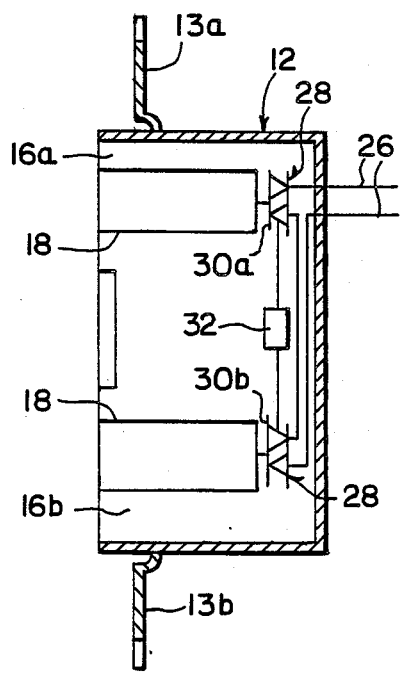
FIG. 3 is a side elevational view, in diagrammatic section, of the inventive outlet of FIG. 2. showing its electrical connection to the AC lines.

Outlet 12 is fed by AC mains or lines 26. As seen in FIGS. 2 and 3, and in general, a switch means 28 is interposed between one of the AC feed lines 26 and a respective finger contact of a given socket 16a and 16b. More particularly and in the example shown, switch means 28 is in the form of a triac one of which, triac 30a, is serially connected between between the "hot" lead of AC mains 26 and contact 18 of socket 16a, and another of which, triac 30b, is likewise serially connected between the "hot" lead of the AC mains and contact 18 of socket 16b. The placement of a given triac 30a or 30b is for purposes of illustration only. A given triac can be placed in series with the "neutral" line of AC mains 26 going to an associated neutral contact 20 of a given socket, or each socket 16a and 16b can include a pair of such triacs one for each hot and neutral "side" of AC mains 26.

Switch means 28 is preferably a solid state device such as the one mentioned. However there are many such solid state devices that can be used to switch the AC current involved. Indeed, means 28 also includes electromechanical relays.

Figures 6, 7:
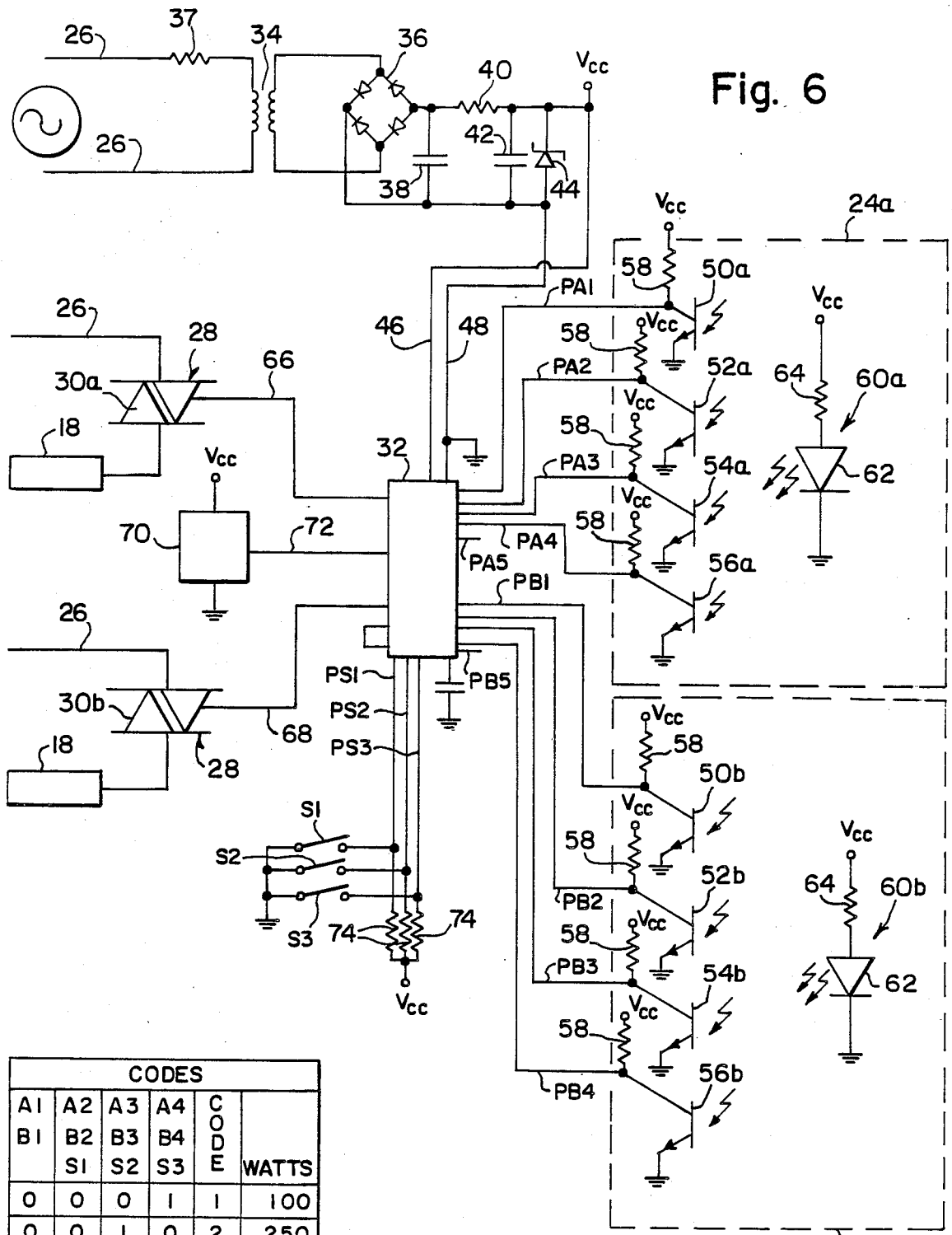
FIG. 6 is a diagrammatic schematic of the inventive microprocessor.
FIG. 7 is a truth or code table for the microprocessor of the inventive apparatus, the table shows how the microprocessor is preprogrammed with data associated with power consumption.

A microprocessor or microcomputer 32 is carried in outlet 12. As seen in FIG. 6, a small transformer 34 steps down the line voltage appearing on mains 26 and applies the same to a diode bridge 36. Standard engineering practice usually includes a low value resistor 37 for current limiting during turn-on. The output of the bridge is filtered by capacitor 38 capacitor 42. The filtered output or Vcc is applied to Zener diode 44. Zener 44 in conjunction with resistor 40 drop the voltage appearing at the Zener cathode to approximately 5 volts or (by changing the value of diode 44) to any given value compatible with microcomputer 32. Leads 46 and 48 apply the regulated DC power to microprocessor 32. Since the current drawn by microprocessor 32 typically is very small, transformer 34 can be small and it along with the diode bridge and above-noted regulator circuitry is easily fit into outlet housing 12. Each sensor 24a and 24b associated with respective sockets 16a and 16b is comprised of a respective array of phototransistors 50a, 52a, 54a, 56a, and 50b, 52b, 54b, 56b. The collector of each phototransistor of each array is tied to Vcc through an associated pull-up resistor 58. Each emitter of each phototransistor of each array is tied to ground. Data inputs PA1-PA4 of the microcomputer are respectively coupled to the pulled-up collector leads of phototransistors 50a, 52a, 54a, 56a. In like manner, data inputs PB1-PB4 are respectively coupled to the pulled-up collector leads of phototransistors 50b, 52b, 54b, 56b.

Each sensor 24a and 24b further includes a respective light source 60a and 60b. More specifically, each light source is, preferably, comprised of a high intensity LED 62 the cathode of which is tied to ground and the anode of which is tied to Vcc through a current-limiting resistor 64. Each LED 62 floods the associated light-active area of a corresponding phototransistor array with light during use and operation of the invention which will be described below. Microcomputer 32 has a triac control line 66 going to and operating triac 30a and another triac control line 68 going to and operating triac 30b.

A temperature sensor 70 is thermally bonded in and to outlet 12. A lead 72 couples the output of temperature sensor 70 to microcomputer 32.

Microcomputer 32 is preprogrammed with the rated output for socket 12 by means of data input lines PS1, PS2, and PS3. Each data input line PS1, PS2, and PS3 is tied to Vcc through a respective pull-up resistor 74. Switches S1, S2, and S3 respectively are interposed between Vss or ground and the microcomputer side of associated pull-up resistors 74. Thus, for example, if switch S1 is closed, a virtual ground (logic low) appears on data line PS1 as the supply voltage or Vcc is dropped across an associated pull-up resistor 74. When a given one of switches S1, S2, or S3 is left open, its respective data line PS1, PS2, or PS3 remains at Vcc or a logic high. Hence by closing various combinations of the last-mentioned switches, the microcomputer is feed information, in the form of a binary code, as seen in FIG. 7, that is interpreted as to the power or current to be drawn from outlet 12 (i.e. the combined available power or current that can be taken from sockets 16a and 16b). This data is preloaded into microcomputer 32. As can be seen in FIG. 7 and in the embodiment shown, only switches S1 and S2 are required for several wattage levels used. Switch S3 is reserved or optional an left for implementation of additional codes.

Figure 4:
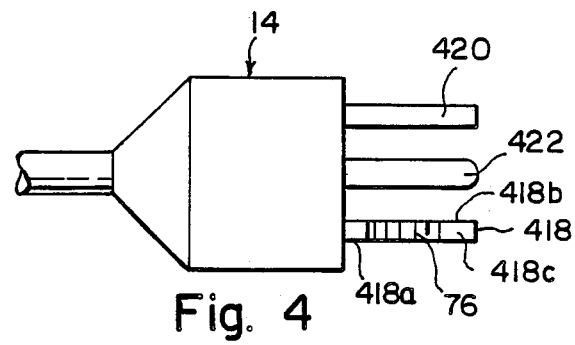
FIG. 4 is a bottom view of the inventive plug shown in FIG. 2., the plug has a conventional construction and is seen with one prong carrying an optical bar code.
Figure 5:
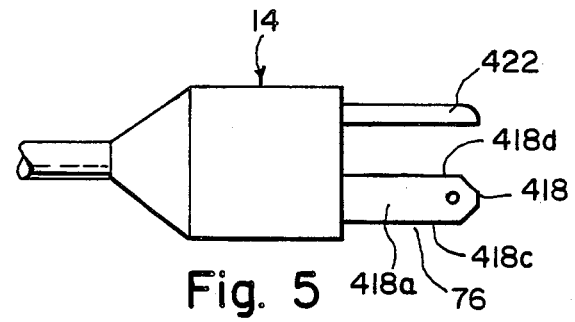
FIG. 5 is a side view of the plug shown in FIG. 4.

An AC plug 14 of conventional outline is shown in FIGS. 4 and 5. As is standard for such plugs, the plug includes three projecting prongs or contact elements. Two prongs or blades, prongs 418 and 420, are designed to frictionally engage the respective hot and neutral fingers 18 and 20 of socket 16. The remaining prong or pin, pin 422, is designed frictionally to seat in ground contact 22 of this socket. Prong or blade 418 is defined by opposed relatively large planar sides 418a and 418b, and relatively thin longitudinal transverse edges 418c and 418d. An optical bar code 76 is placed on transverse edge 418c, as shown. The code carries information as to the amount of current or power drawn by the appliance or device to which it is attached. The location of optical code 76 is for purposes of illustration only. The bar code can be placed practically anywhere on either blade 418 or 420, or indeed on pin 422. In fact in is conceivable that the code can be taken off the blade or pins and placed on that face of the plug body which immediately faces or confronts the outboard face of the socket (with a likewise repositioning of the code sensor). The important design criteria is that the location of the code on the plug be correlated with the position of sensor 24 in the outlet so that the code can be read when the former is inserted in the latter during use and operation of the invention as will be described now.

In use and operation of the invention, plug 14 is inserted into either socket 16a or 16b. Each socket is normally kept off or inhibited by associated triac 30a or 30b under control of microcomputer 32. Microcomputer 32 continually scans both sensors 24a and 24b for a valid code. When plug 14 is inserted into a socket, the bar code carried thereon sweeps past an associated array of phototransistors. As the plug enters a given socket, its code is flooded with light from an associated LED 62. As the optical code, in the form of a precisely positioned array of spaced dark bars on a light background, passes under a corresponding array of phototransistors, the respective collector leads thereof will be either held at Vcc, a logic high, or switched to virtual ground, a logic low, depending on the type of bar code on plug 14. That is to say, the bar code activates the respective phototransistor of a given array causing data lines PA1–PA4 or PB1–PB4 to assume defined logic levels in response to a given code on the plug. This change in state along either of respective data lines PA1–PA4 or PB1–PB4 is coupled to microcomputer 32 because the microcomputer continually scans both such data lines. If the code thus communicated indicates that the current to be drawn is less than the amount preprogrammed into associated data lines PS1 and PS2 of the microcomputer, as noted above and mapped in FIG. 7, then the microcomputer applies a signal to the associated triac control line to turn on the respective triac. Electrical power is then applied to plug 14. If the code communicated to microcomputer 32 indicates that the current or wattage to drawn is greater than the amount preprogrammed into microcomputer 32, the triac associated with the given one of sockets 16a or 16b will remain off thus inhibiting power to plug 14.

When a second plug 14 is inserted into the unused socket of outlet 12, the associated sensor thereof reads the code and communicates the same to microcomputer 32. If the sum to be drawn by both plugs is less than the amount preprogrammed into the microcomputer, the triac control line associated with this second socket is sent a signal which turns on its associated triac. Electrical power is now applied to this second plug. If the current to be drawn by the second plug is greater than the preprogrammed amount, a valid code will not be detected by microcomputer 32 and power to second plug will remain inhibited or off. This sequence of events can not be overriden by the user. In this latter case, where two plugs are simultaneously reside in outlet 12, and the second plug exceeds the preprogrammed amount for the outlet, all the user user can do is remove one of the plugs. Microcomputer 32 will sense such removal and then either turn on power to the second plug (if a valid code is detected and the first plug is removed) or maintain power to the first-inserted plug.

Temperature sensor 70 continually monitors the temperature of outlet 12. If this temperature rises above a preset amount, sensor 70 applies a signal to microcomputer 32 whereby the same can shut down power to both sockets. Of course a given one of sensors 70 can be thermally bonded to a give one of sockets 16a and 16b for more precise control (a given socket can be turned off, while another remains on) and greater sensitivity to thermal effects.

As noticed in FIG. 6, microcomputer or microprocessor 32 includes a pair of unused data lines, PA5 and PB5, each one of which is associated a respective socket 16a and 16b. Each of the last-mentioned data lines can be coupled to an associated current sensor (not shown). In the event that excessive current is drawn through either plug, a corresponding signal will be sent to microprocessor 32. The microcomputer will respond by turning off either or both triacs 30a and 30b thereby electrically isolating the load from the line.

The type of code used on plug 14 and read by associated sensor 24a and 24b can be any type of code that can be placed on the plug and read by a sensor, with the latter preferably small enough to fit into outlet 12. For example, in addition to the optical bar type code noted, the code can be magnetic (with a corresponding magnetically sensitive sensor), mechanical (such as a notched code), or capacitive.

While only a few embodiments of the present invention have been shown and described, it is to be understood that many changes and modifications can be made hereto without departing from the spirit and scope hereof.

What is claimed is:

1. An intelligent outlet adapted to matingly receive a plug said pug carrying optically coded information in addition to the presence of said plug in said outlet, information at least indicative of the power to be drawn by said plug and the load attached thereto, said outlet comprising at least one socket adapted to receive the plug and having optical sensor means carried in the outlet adapted to read the code of the plug when the same is inserted into said socket, microprocessor means carried in the outlet and in electrical communication with said sensor, and switch means carried in the outlet and operated by said microprocessor, said switch means being interposed between a power line and a contact of said socket, said microprocessor adapted to scan said sensor whereby when the plug is inserted into said socket and said sensor detects a code valid for said outlet, said microprocessor activates said switch means thus to apply power to the plug.

2. The intelligent outlet of claim 1, said microprocessor being preprogrammed with the load carrying capabilities of the power line and outlet.

3. The intelligent outlet of claim 2, said switch means including a solid state device.

4. An intelligent AC outlet of conventional in-the-wall mount configuration which is adapted to mate with a conventionally configured plug carrying coded information as to the current to be drawn from the AC power lines comprising two sockets each one adapted to receive one such coded plug, sensor means carried in the outlet and adapted to read the code carried on the plug when the same is inserted into either of said sockets, microprocessor means carried in the outlet and in electrical communication with said sensor means, and switch means interposed between the AC power lines and a respective one of said sockets, the last-mentioned means being operated by said microprocessor, said microprocessor adapted to scan said sensor means such that when the plug is inserted into either of said sockets and a valid code detected, said microprocessor operates said switch means thus to apply power to the plug.

5. The intelligent AC outlet of claim 4, said microprocessor being preprogrammed to inhibit power to the last-inserted plug.

6. The intelligent AC outlet of claim 5, said switch means comprising a solid state device.

7. The intelligent AC outlet of claim 5, said solid state device comprising a triac.

8. The intelligent AC outlet of claim 5, said code being placed on one of the prongs of said plug.

9. The intelligent AC outlet of claim 5, having two sockets said sensor means comprising two sensors, each one of said sensors associated with a respective one said socket.

10. The intelligent AC outlet of claim 5, said sensor including an array of phototransistors.

11. For use with a microprocessor controlled AC outlet wherein the outlet includes a socket and a code reading sensor, a plug adapted to be inserted in the socket and carry electrical power, and a bar type optical code carried on said plug, said code carrying information in addition to its presence in the outlet, as to the current to be drawn by said plug so that when the same is inserted into the socket, the sensor communicates a signal to the microprocessor which, if valid, causes the microprocessor to turn on the socket and apply power to said plug.

* * * * *